(12) United States Patent
Bitetto

(10) Patent No.: US 10,425,525 B1
(45) Date of Patent: Sep. 24, 2019

(54) PEDESTRIAN COLLISION AVOIDANCE SYSTEMS AND METHODS

(71) Applicant: James J. Bitetto, Dix Hills, NY (US)

(72) Inventor: James J. Bitetto, Dix Hills, NY (US)

( * ) Notice: Subject to any disclaimer, the term of this patent is extended or adjusted under 35 U.S.C. 154(b) by 0 days.

(21) Appl. No.: 16/044,069

(22) Filed: Jul. 24, 2018

(51) Int. Cl.
*H04M 1/725* (2006.01)
*G06K 9/00* (2006.01)
*G08B 21/02* (2006.01)
*G06F 3/01* (2006.01)
*H04W 4/024* (2018.01)

(52) U.S. Cl.
CPC ........ *H04M 1/72569* (2013.01); *G06F 3/016* (2013.01); *G06K 9/00805* (2013.01); *G08B 21/02* (2013.01); *H04W 4/024* (2018.02)

(58) Field of Classification Search
CPC ...... G06F 3/0484; G06F 3/016; G06F 3/0481; G08B 21/02; H04M 1/72569
USPC .......................................... 340/573.1, 686.6
See application file for complete search history.

(56) References Cited

U.S. PATENT DOCUMENTS

| | | | | |
|---|---|---|---|---|
| 8,953,841 B1* | 2/2015 | Leblang | ............ | G06K 9/00671 345/633 |
| 2011/0298614 A1* | 12/2011 | Bells | .................... | G06Q 10/109 340/539.13 |
| 2012/0032806 A1* | 2/2012 | Lee | ................... | H04M 1/72577 340/573.1 |
| 2013/0244731 A1* | 9/2013 | Oishi | ...................... | H04M 1/23 455/566 |
| 2014/0066097 A1* | 3/2014 | Kolodziej | ............. | H04W 4/023 455/456.3 |
| 2016/0091606 A1* | 3/2016 | Shin | ....................... | G01S 15/025 367/112 |
| 2016/0246449 A1* | 8/2016 | Jarske | ................... | G06F 3/0436 |
| 2018/0204437 A1* | 7/2018 | Singh | .................... | G08B 21/02 |
| 2018/0225513 A1* | 8/2018 | Bender | ............. | G06K 9/00671 |
| 2018/0300771 A1* | 10/2018 | Roger | ................ | G06Q 30/0277 |

* cited by examiner

*Primary Examiner* — Eric Blount
(74) *Attorney, Agent, or Firm* — Tutunjian & Bitetto, P.C.; James J. Bitetto

(57) ABSTRACT

A collision avoidance device includes a mobile device having a display screen. A proximity sensor is disposed on a side opposite the display screen. The proximity sensor is positioned to detect any obstacles present in a path of a user operating the display screen while moving. A warning device is powered by the mobile device to alert the user of any obstacles in the path.

23 Claims, 8 Drawing Sheets

PEDESTRIAN COLLISION AVOIDANCE SYSTEMS AND METHODS

BACKGROUND

Technical Field

The present invention generally relates to mobile devices, and more particularly to systems and methods for avoiding pedestrian collisions when portably operating a mobile device.

Description of the Related Art

Mobile devices are used by people in many situations. While it is less than optimal to employ the use of a mobile device when walking, many people still do so. This results in collisions with other pedestrians, objects or other obstacles.

SUMMARY

In accordance with an embodiment of the present invention, a collision avoidance device includes a mobile device having a display screen. A proximity sensor is disposed on a side opposite the display screen. The proximity sensor is positioned to detect any objects and obstacles present in a path of a user operating the display screen while moving. A warning device is powered by the mobile device to alert the user of any objects and obstacles in the path.

Another collision avoidance device includes a mobile device having a display screen and a camera disposed on a side opposite the display screen. The camera is configured to detect any objects and obstacles present in a path of a user operating the display screen while moving. A warning device is provided to alert the user of any objects and obstacles in the path.

In other embodiments, the warning device can include an alert selected from the group consisting of an audible alarm, a visible light, a haptic signal and an image on the screen. The mobile device can include a cellular telephone, and the warning device can be activated by an application stored in memory of the cellular telephone. The application stored in memory can include user options for setting a mode and intensity of an alert of the warning device. The proximity sensor can be activated to detect the objects and obstacles when steps of the user are detected. The camera and one or more proximity sensors can be employed together to detect the objects and obstacles. The warning device can include an image displayed in a portion of the screen while another application is being viewed by the user. The image displayed in the portion of the screen can include a video of activities in the path and/or a map depicting objects and obstacles in the path. The image can be resizable and positionable on the screen, e.g., by drag and drop or other methods. The map can include a bird's eye view of an area in a direction of movement in the path.

In one embodiment, the camera is coupled to an actuation device configured to angle the camera to capture images in front of the user as the user moves. An optical device can be disposed in front of a lens of the camera to redirect light toward the camera to detect the objects and obstacles present in the path. The optical device can include a reflective or refractive media. The optical device can include or be part of a structure that includes a clip-on cover or a slide device to permit positioning of the optical device in an operational relationship with the camera.

A method for collision avoidance includes providing a mobile device having a display screen with a detector including at least one of a proximity sensor and/or a camera disposed on a side opposite the display screen, the detector being positioned to detect any objects and obstacles present in a path of a user operating the display screen while moving; and warning the user of any objects and obstacles in the path.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
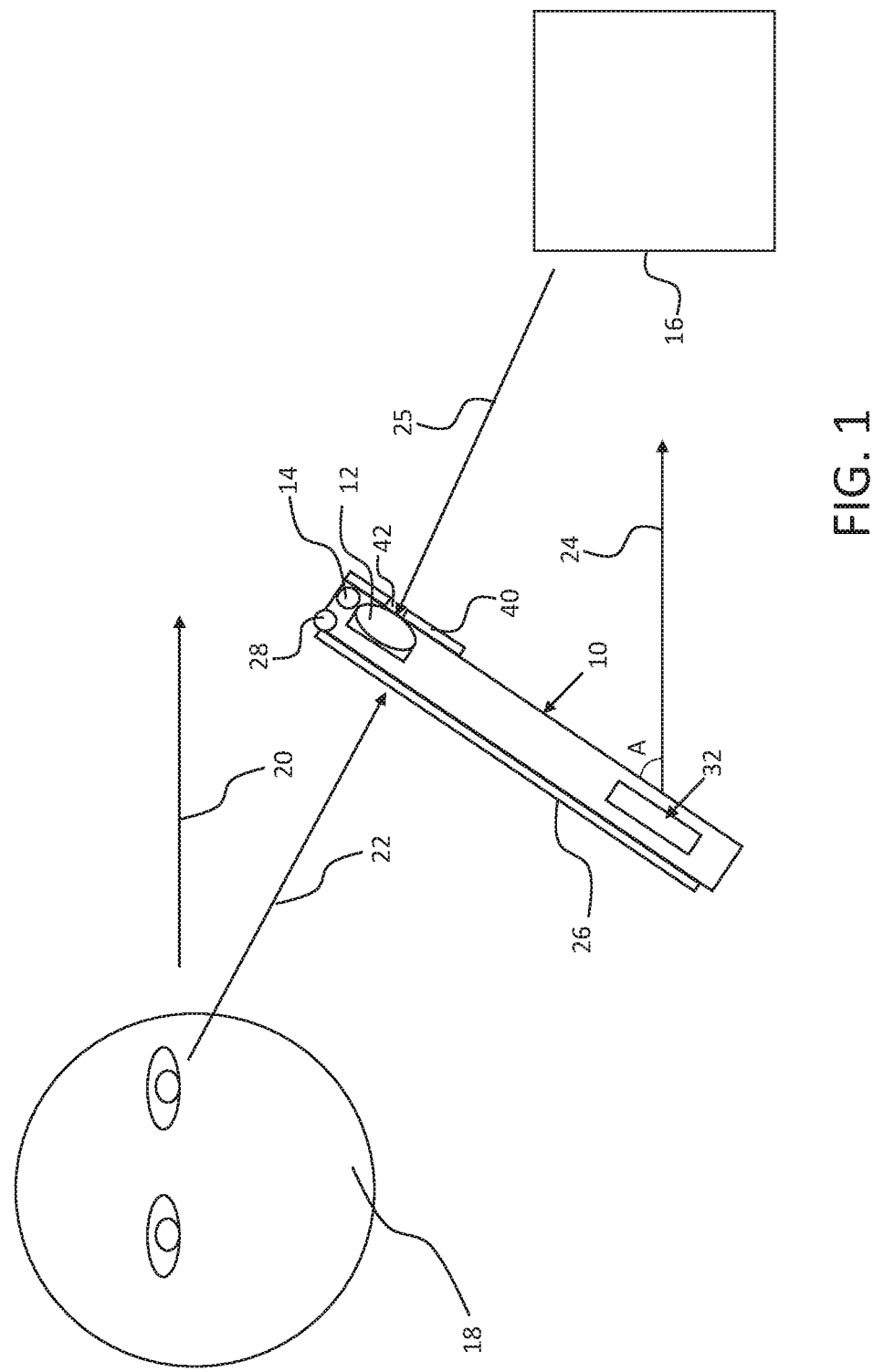
FIG. 1 is a schematic view showing a collision avoidance system in accordance with one embodiment of the present invention.

In accordance with aspects of the present invention, systems and methods are provided for pedestrian safety when operating mobile devices, e.g., when walking, jogging or otherwise moving. Users often pay too much attention to their mobile devices and do so while walking, etc. In many settings, it is not uncommon to see people looking at mobile device displays rather than paying attention to the environment around them. In one embodiment, the mobile device can include a proximity sensor on a forwarding facing surface of the mobile device (e.g., on an opposite side of the mobile device from the device display) and/or on sides of the mobile device. The proximity sensor is configured to sense the presence of an object or objects such as a street lamp, a car, another pedestrian or any other object or obstacle that can enter the path of the user when walking. The proximity sensor can be configured in a number of ways that works with the mobile device.

In one embodiment, a warning light (or area of the display) is activated to flash at an increased frequency or intensity as the object approaches the user. In another embodiment, the display of the device can have an indicator that provides distance and speed data relative to approaching objects. In another embodiment, an image of the approaching object is provided by a forward facing camera, on the display screen. Other warning mechanisms and techniques are also contemplated.

It is to be understood that aspects of the present invention will be described in terms of a given illustrative architecture; however, other architectures, structures, materials and process features and steps can be varied within the scope of aspects of the present invention.

It will also be understood that when an element such as a layer, region or object is referred to as being "on" or "over" another element, it can be directly on the other element or intervening elements can also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

Reference in the specification to "one embodiment" or "an embodiment", as well as other variations thereof, means that a particular feature, structure, characteristic, and so forth described in connection with the embodiment is included in at least one embodiment. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Spatially relative terms, such as "beneath," "below," "lower," "above," "upper," and the like, can be used herein for ease of description to describe one element's or feature's relationship to another element(s) or feature(s) as illustrated in the FIGS. It will be understood that the spatially relative terms are intended to encompass different orientations of the device in use or operation in addition to the orientation depicted in the FIGS. For example, if the device in the FIGS. is turned over, elements described as "below" or "beneath" other elements or features would then be oriented "above" the other elements or features. Thus, the term "below" can encompass both an orientation of above and below. The device can be otherwise oriented (rotated 90 degrees or at other orientations), and the spatially relative descriptors used herein can be interpreted accordingly. In addition, it will also be understood that when a layer is referred to as being "between" two layers, it can be the only layer between the two layers, or one or more intervening layers can also be present.

It will be understood that, although the terms first, second, etc. can be used herein to describe various elements, these elements should not be limited by these terms. These terms are only used to distinguish one element from another element. Thus, a first element discussed below could be termed a second element without departing from the scope of the present concept.

Referring now to the drawings in which like numerals represent the same or similar elements and initially to FIG. 1, a schematic diagram illustratively shows a mobile device 10 employing an obstacle avoidance system in accordance with one embodiment. Object or obstacle can be employed interchangeably throughout this disclosure. The mobile device 10 includes a display 26 facing a user 18. The user 18 may gaze in a direction of arrow 22 toward the display 26 of the mobile device 10 to use the functions of the device 10. Although not optimal, the user 18 may begin to walk of otherwise move while operating the device 10. In this situation, the user 18 may be unaware of an approaching object 16 since the user's vision in the direction of arrow 20 is limited. This can lead to accidents, collisions and injury.

In accordance with one embodiment, a proximity sensor or sensors 14 is/are provided on a forward facing surface of the device 10. In some embodiments, proximity sensors can be employed on one or more sides of the device as well. The user 18 moves in a direction of arrow 24, e.g., the direction of motion of the user (toward an approaching object 16). The proximity sensor or sensors 14 detect the approaching object 16 using a reflected signal or change in capacitance to alert the user 18 of an impending collision. The proximity sensor or sensors 14 can be aligned with the direction of the motion of the device 10. For example, if the user 18 holds the device 10 at angle "A" of approximately 20-75 degrees with a horizontal surface, the proximity sensors 14 can be rotatably offset so that the approaching object 16 can be detected at a suitable distance (e.g., 3-5 feet) from the user 18 and device 10. In one embodiment, the angle of the proximity sensor 14 or its sensing angle can be adjusted to increase or decrease the detection distance between the device 10 and the approaching object 16. This can be varied to accommodate the speed of the user.

In accordance with one embodiment, a camera or camera lens 12, e.g. a camera unit, imaging chip, imaging device, etc. or the lens for the camera is provided on a forwarding facing surface (opposite the display 26) on the device 10. The camera 12 can be employed with or without the proximity sensors(s) 14. The camera 12 can include an on-board camera already provided on the device 10 or can be an add-on that communicates with the device 10. The camera 12 can detect light 25 from the approaching object 16 to alert the user 18 of an impending collision. The camera 12 can be aligned with that direction of the motion of the device 10. For example, if the user 18 holds the device 10 at angle "A" with a horizontal surface, the camera 12 can be offset so that the approaching object 16 can be detected at a suitable distance from the user 18 and device 10. In one embodiment, the angle of the camera 12 or its lens center line can be adjusted to increase or decrease the detection distance between the device 10 and the approaching object 16. In one embodiment, the lens of the camera 12 can include a wide-angle lens so that a wide range of forward facing angles can be covered. In another embodiment, the camera 12 can be rotated using an actuator or manual adjustment. A cover 40 or slide may be employed to direct the field of view forward to detect object in the field of view. The cover 40 can be selectively integrated with the camera 12, can be an attachment or employ software to adjust the field of view. In addition, objects (16) above and below the device 10 can be also tracked.

In one embodiment, the device 10 includes an application 32 (app or program) that can measure the distance to a remote object or can determine the amount of pixel area previously occupied versus the amount of pixel area currently occupied to determine whether objects are getting closer. Other methods can also be employed. As the object or objects 16 get closer, the app 32 will send a prompt, provide a warning or otherwise alert the user 18 that an object is approaching or being moved toward the user. A warning or alert can be generated on the screen or display 26 to alert the user 18 in real-time that a collision may be imminent.

The warning or alert can include features on the device 10 or may be configured to be generated on the display 26. In one embodiment, the warning or alert can include a light emitting diode 28 of a particular color or flashing pattern or frequency. In another embodiment, the warning can include a portion of the display and can include a text message, a visual beacon, an image, a live video feed of the activity in the camera 12, etc.

During operation, the proximity sensor 14 or another sensor, e.g., an accelerometer, a global positioning app, a light sensor, a step sensor or any other trigger mechanism can be employed to sense forward motion of the device 10 during usage. The device 10 can automatically activate the warning system to detect possible objects 16 that could cause a collision. The user 18 moves forward, and the proximity sensor 14 detects objects 16 in the path of the user 18. As objects get closer or enter a field of view of the device 10, the appropriate warning is generated to avoid a collision between the user 18 and the object 16. The appropriate warning can include an audible alarm, a flashing light, a streamed video, a textual message, a vibration, etc.

In another embodiment, a clip-on cover or clip 40 having a slit or opening 42 therein can be placed over the camera lens 12 to direct the field of view for avoiding collisions. The clip 40 can be provided with the device 10 or can be placed on the device 10 as a separate piece of hardware. The clip 40 can be removable or may be provided as a slide on the back of the phone or as a part of a camera protection case.

Figure 2:
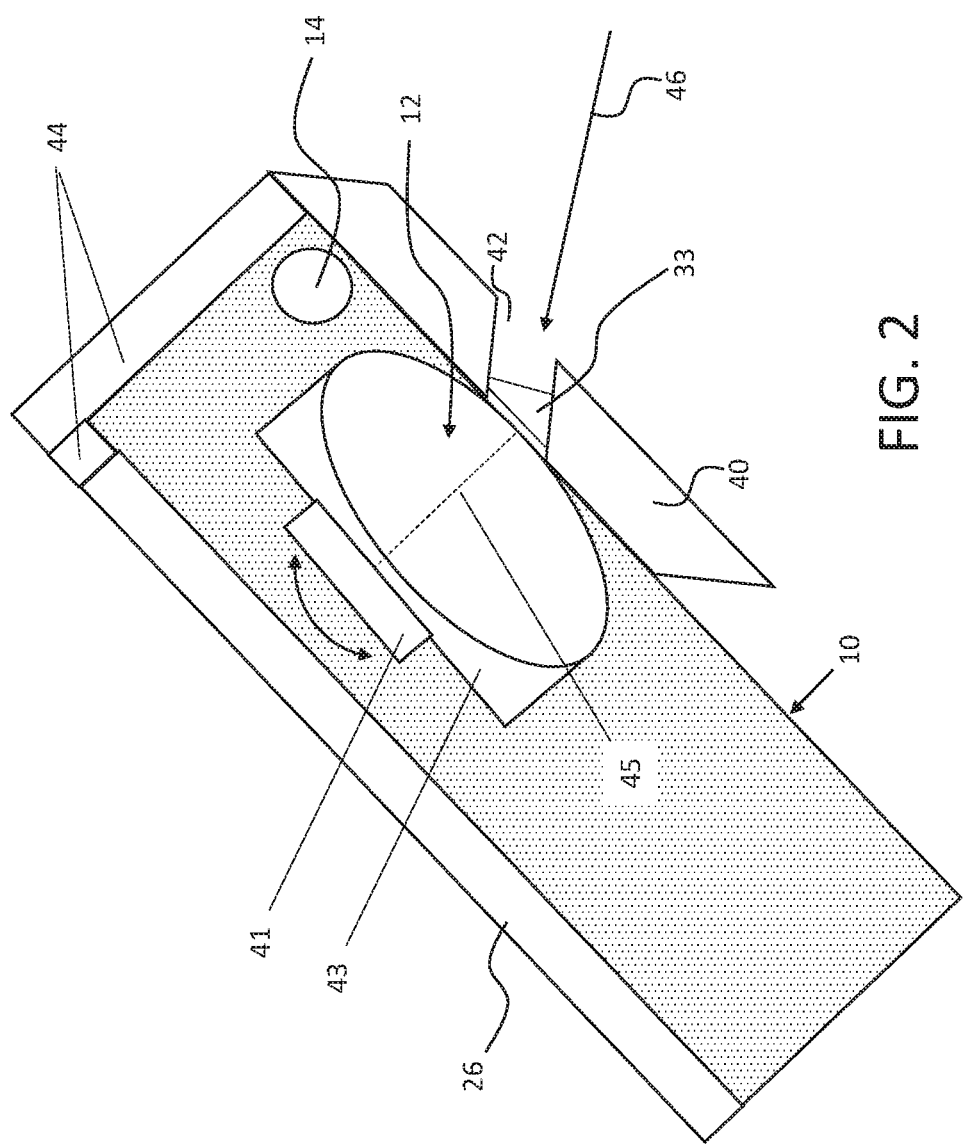
FIG. 2 is an enlarged view of the schematic view of FIG. 1 showing the collision avoidance system in greater detail in accordance with one embodiment of the present invention.

Referring to FIG. 2, a more detailed cross-sectional view of the device 10 is shown. In one embodiment where a camera is employed, the camera 12 can include a rotating focal axis 45 that can adjust its angle relative to a direction of travel for the user. A camera lens 12 can be seated in a rotatable housing 43 that can be pivoted by an actuator or manual adjustment mechanism 41 to redirect the camera aperture so that the viewing angle (e.g., angle "A", FIG. 1) provides a desired distance for scanning for objects. In this way, the camera 12 can be employed to see what is happening in front of the user especially while the user is walking with and using the device 10.

In one embodiment, the slit or opening 42 can include a mirror or other reflective device or surface (e.g., similar to a periscope) or other optical component 33 (such as, e.g., refractive media) to adjust the angle of the incoming light 46 to be level or substantially level with the direction of motion of the user. The optical element 33 can include a mirror arranged to redirect light into the camera 12. In one embodiment, the optical element 33 can include a transparent material that is selected in composition and size to redirect incoming light 46 so that the on-board camera of the device 10 can be employed to look ahead of a walking user while operating the device 10. The clip or cover 40 can clip over a top portion of the device 10 to grasp the top of the device 10. The clip 40 can include an attachment structure 44 to secure the clip 40 in place and hold the clip 40 in position during usage.

Figure 3:
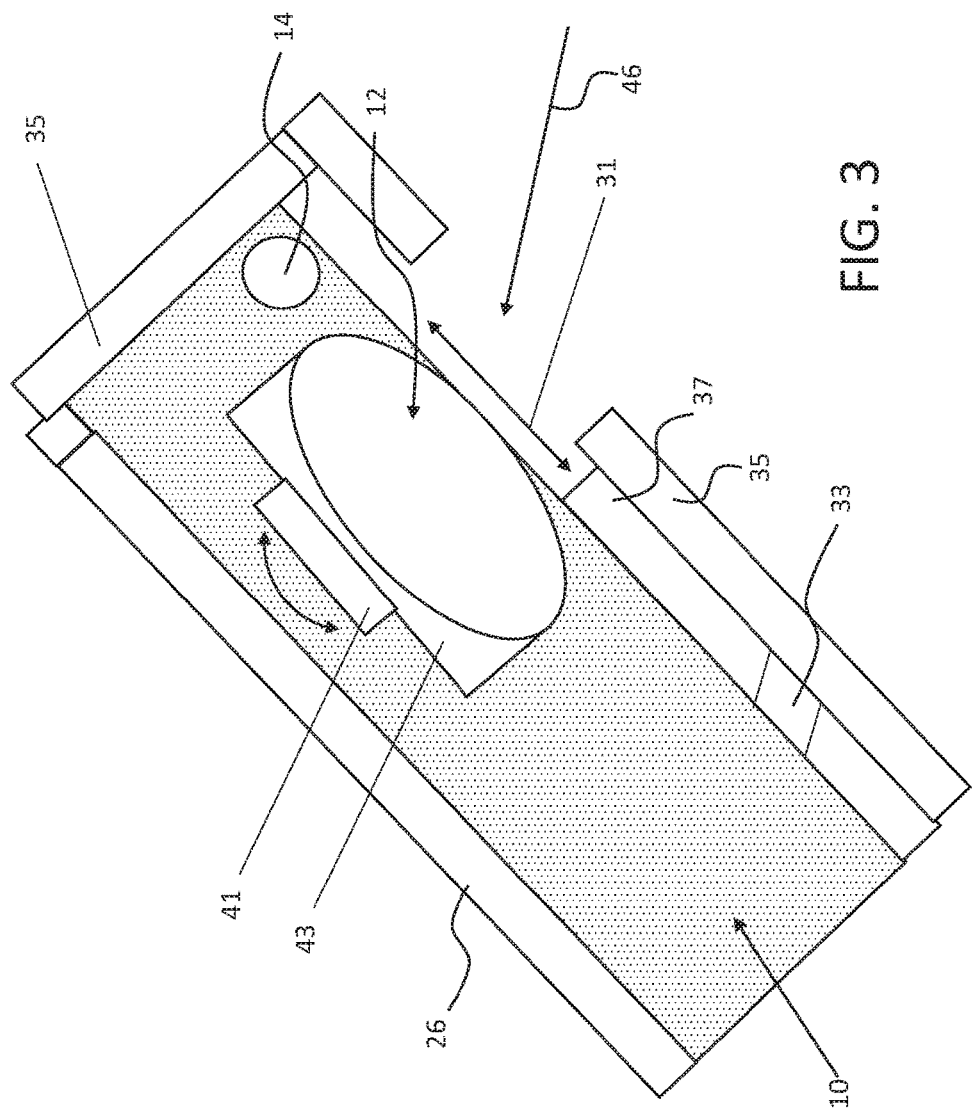
FIG. 3 is an enlarged view of the schematic view of FIG. 1 showing the collision avoidance system in greater detail in accordance with another embodiment of the present invention.

Referring to FIG. 3, in another embodiment, a slide 37 or external attachment may be applied over the camera 12 of the device 10. The slide 37 can include a slit or opening to limit and/or redirect incoming light 46. The slit or opening can include a mirror (e.g., reflective surface) or other optical component 33 (such as, e.g., refractive media) to adjust the angle of the incoming light 46 to detect objects in the direction of motion of the user. The optical element 33 can include, e.g., a mirror arranged to redirect light into the camera 12. In one embodiment, the optical element 33 can include a transparent material that is selected in composition and size to redirect incoming light 46 so that the on-board camera of the device 10 can be employed to look ahead of a walking user while operating the device 10.

The slide 37 can be retractable and built into the device 10 or built into a case 35 in which the device is placed (e.g., a phone case). The case 35 (or device 10) can include the slide 37, which can be actuated manually in the direction of arrow 31 to place the slit 42 in front of the camera lens 12 when in use and retract the slide 37 away when not in use.

Figure 4:
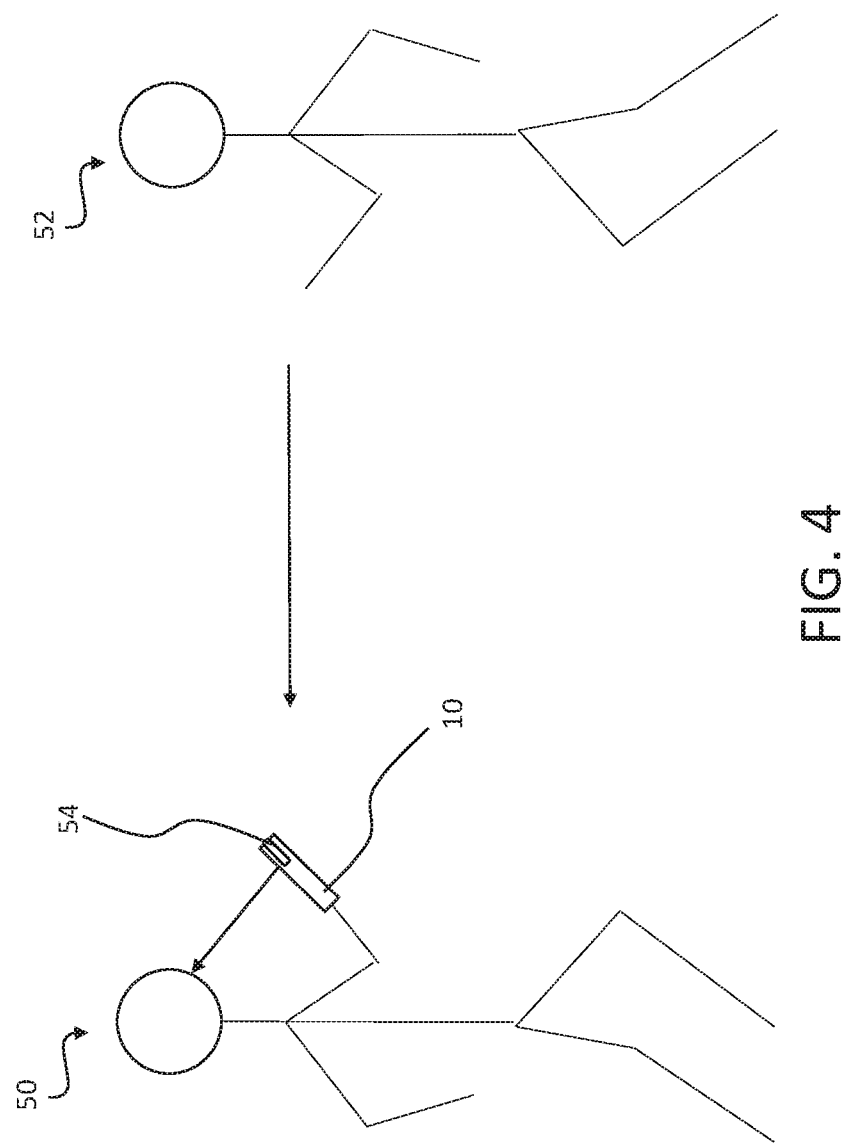
FIG. 4 is a schematic view showing one application of the collision avoidance system in accordance with one embodiment of the present invention.

Referring to FIG. 4, in one implementation, a user 50 begins to walk while looking at their mobile device 10. The mobile device 10 includes a collision avoidance feature 54, e.g., a camera 12 that looks forward to see another person 52 in the path of user 50. Since the user 50 is preocccupied, a window showing the camera image on the user's screen provides an early warning that a collision is possible. By showing the image in a portion of the screen or by activating an alarm, the collision with person 52 can be avoided. In some embodiments, for example, with visible light or audible sound both of the people 50 and 52 are warned.

Figure 5:
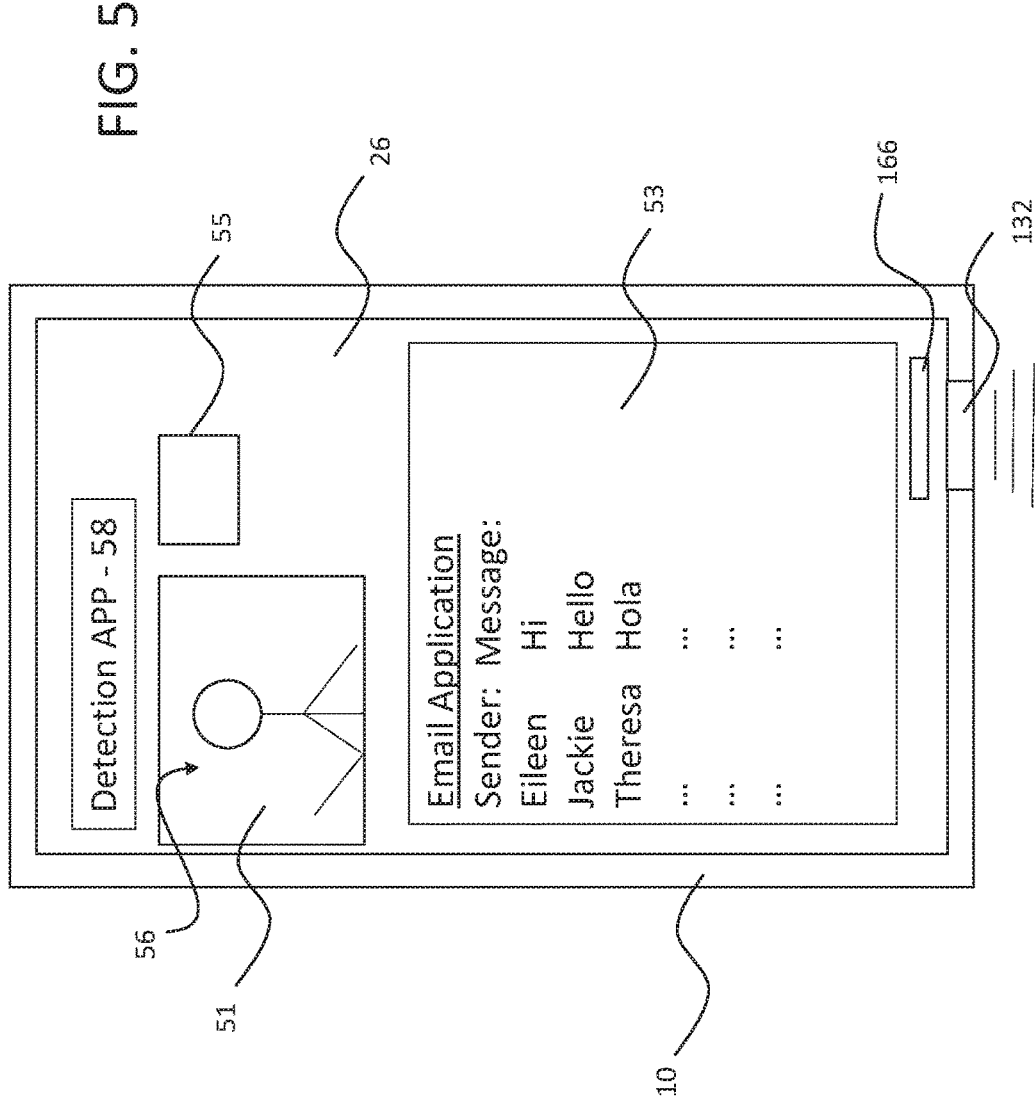
FIG. 5 is a schematic view showing a display of the collision avoidance system in accordance with one embodiment of the present invention.

Referring to FIG. 5, a screen 26 of a device 10 is shown in accordance with one embodiment. The device 10 can include a collision avoidance application (app) 58 (which can be downloadable) or can be configured with one or more sensors to sense when the user is operating the device when walking. The one or more sensors can include accelerometers or other sensors that are already included on the device 10 (e.g., if the device is a smart phone or tablet). The device 10 may also include, e.g., step counting, which can sense when a user is walking to activate one or more features.

The app 58 can provide a camera image 51 on the screen 26 automatically when walking/moving is sensed or when manually activated (e.g., opening the app 58 and activating walking/running mode). The camera 12 (FIG. 1) can be adjusted or configured with a slide 37 or clip 40 (FIGS. 2 and 3) to provide a forward looking line of sight. The slide 37 or clip 40 can be included in the device 10 or in its case or be an attachment. The camera image 51 can be displayed on the screen 26 concurrently with other applications 53, e.g., email applications, video applications, etc. The screen 26 is apportioned or split to show live images 56 of activity occurring in the direction of motion of the user. The screen 26 can be made larger or smaller in accordance with user preferences. The camera image 52 can be expanded/contracted and repositioned (e.g., drag and drop) using any available capabilities.

The screen 26 can include a region 55 instead of or in addition to the image 51 that can display a simple color, text message or other symbol or indicator. The image 51, e.g., can include a yellow, orange and red mode to indicate the proximity of an obstacle. The image 51, e.g., can include text, such as, e.g., watch out, danger, all clear, etc. The image 51, e.g., can include a flashing mode, haptic mode or audible mode where the frequency increases as you get closer to an object. Other warning modes are also contemplated.

A speaker 132 can be employed to provide warning tones or verbal responses instead of or in addition to the visual or other warnings. The intensity and/or word choice can be intensified or increased (or decreased) based on the proximity distance with obstacles. A haptic device 166 can be employed to provide warning vibrations instead of or in addition to the visual or other warnings. The intensity can be intensified or increased (or decreased) based on the proximity distance with obstacles.

Figure 6:
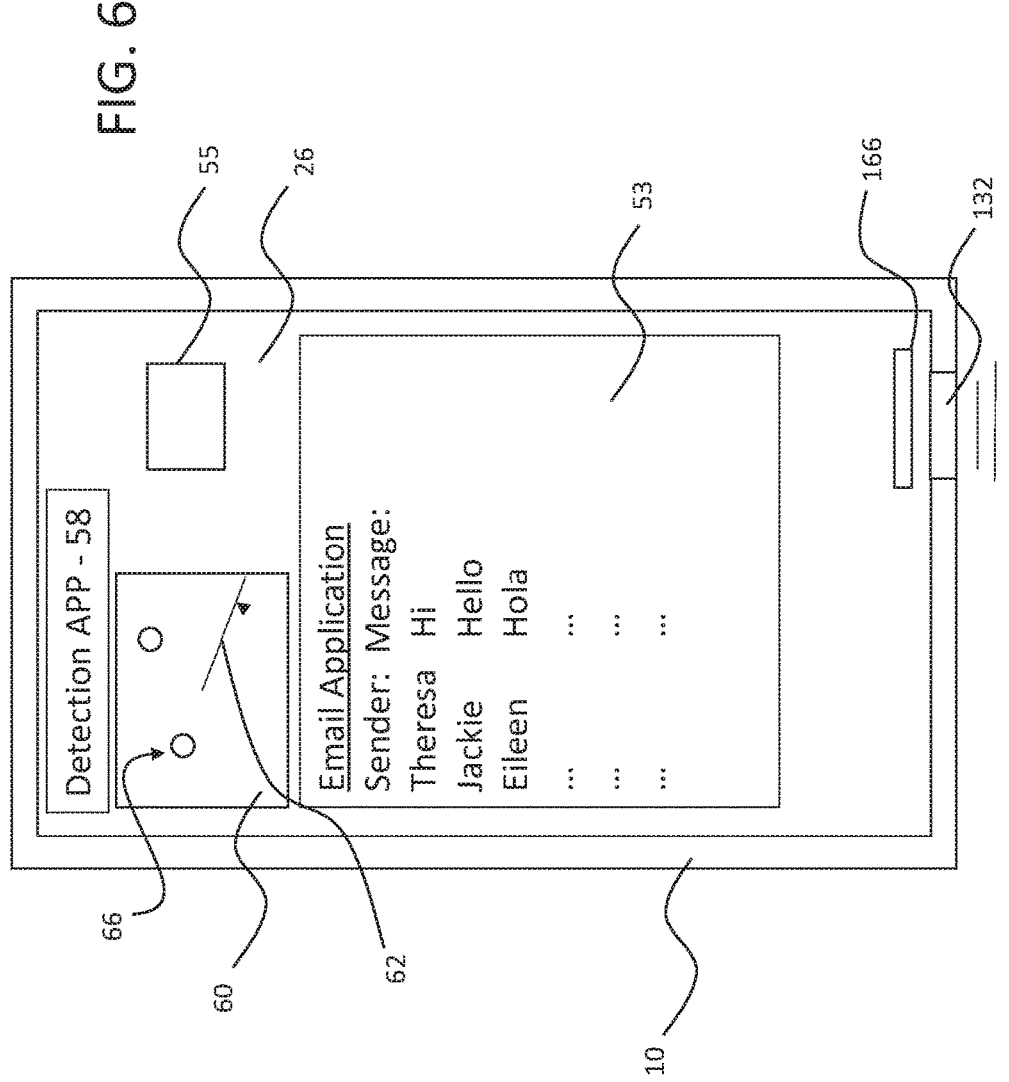
FIG. 6 is a schematic view showing a display of the collision avoidance system in accordance with another embodiment of the present invention.

Referring to FIG. 6, in another embodiment screen 26 can include a map display 60 instead of or in addition to the camera image 52 (FIG. 5). The map display 60 can display representations of objects 66 detected by the camera 12 and/or by the one or more proximity sensors 14. Objects in the immediate area of the device 10 that are sensed can be rendered for display on the map display 60. This can be performed by changing the pixel color or texture in the image to match a size and shape of the objects detected by the proximity sensor(s) 14 and/or the camera 12. The conversion of sensing data to pixel images can be performed using the app 58 loaded on the device 10. Other representations and display styles are also contemplated form the map display 60.

In a particularly useful embodiment, the map display 60 can include a bird's eye view of approaching objects. In one embodiment, a radar screen with a radar line 62 rotating about a point to provide the appearance that objects are being detected by radar can be employed. Other mapping technologies can also be simulated of the map display 60, e.g., sonar pings, iso-lines (e.g., lines showing equal distances to objects), etc. The map display 60 can include any suitable graphics that can be user-selected or set by default. For example, in one embodiment, the objects can be represented by smiley faces, circles, etc.

Referring to FIGS. 5 and 6, in some applications, the screen 26 can include a region 55 that flashes or displays different colors or textures, different brightnesses, different words or other warning information about the status of approaching objects. The device 10 can include a dedicated light or beacon 28 (FIG. 1, e.g., a light emitting diode (LED)) or can employ a portion of the screen 26 as a visual warning device, e.g., portion 55. In simple embodiments, only the visual warning device (55 or 28) may be employed. In other embodiments, the speaker 132 can be activated with a tone, sound or verbal utterance to provide a warning. In other embodiments, the haptic device 166 can be activated to provide a warning.

It should be understood that any combination of warning devices can be employed. For example, the beacon 28, region 55, speaker 132, haptic device 166 can be employed alone or with the camera image 26 or with the map display 60 or any combination of these or other warning mechanisms. For example, a haptic warning mechanism 166 that employs the device's vibration mechanism as a warning can be employed with, e.g., the speaker 132. The vibration warning can also be employed independently as one embodiment, e.g., using the vibratory capabilities of the mobile device.

Figure 7:
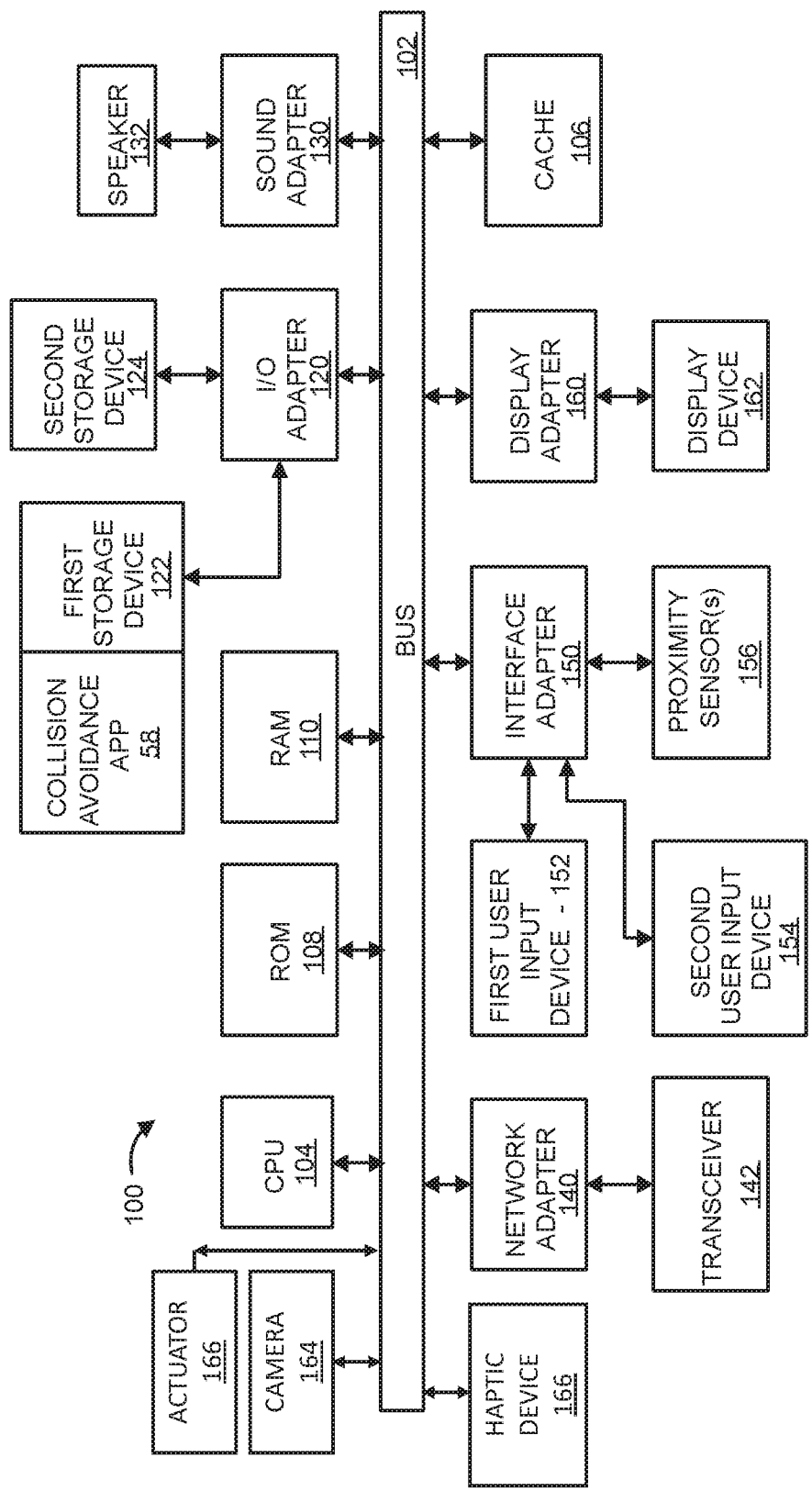
FIG. 7 is a block diagram showing a collision avoidance system in accordance with another embodiment of the present invention.

Referring to FIG. 7, an exemplary processing system 100 to which aspects of the present invention may be applied is shown in accordance with one embodiment. The processing system 100 can include a cellular telephone, a tablet, a lap top, or any other portable computing device that is likely to be used during walking or moving. The processing system 100 includes at least one processor (CPU) 104 operatively coupled to other components via a system bus 102. Other components may include one or more of the following. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, can be operatively coupled to the system bus 102.

A first storage device 122 and a second storage device 124 can be operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a touchscreen, a device incorporating the functionality of at least two of the preceding devices, and so forth. Of course, other types of input devices can also be used in accordance with aspects of the present invention. The user input devices 152, 154, and 156 can be the same type of user input device or different types of user input devices. The user input devices 152, 154, and 156 are used to input and output information to and from system 100. In one embodiment, proximity sensors 156 are operatively coupled to system bus 102 and are employed to detect oncoming objects for a user employing system 100, e.g., device 10.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

An app 58 can be stored in a storage device, e.g., the first storage device 122. The app 58 can include an icon (58, FIGS. 5 and 6) generated on the display device 132 which can be activated by a user when the app 58 is needed. The app 58 can include algorithms for interpreting proximity sensor data, providing user options for displaying or processing warnings, providing settings for use selected preferences (e.g., mode of operation (e.g., sound only, camera only, etc.), on/off functions, etc.).

Proximity sensors 156 can include infrared (IR) based proximity sensors to detect the presence of an object or obstacle to avoid inadvertent collisions. In other embodiments, capacitive proximity sensing technology may be employed for proximity sensors 156, especially for use in crowds or populated areas. The proximity sensors 156 and/or a camera 164 can be employed for object/obstacle detection. Other methods for proximity sensing can also be employed, e.g., any method that provides energy and measures the reflected energy.

In one embodiment, a wake-on approach feature can be employed to make the user aware of obstacle/objects in their path or someone approaching the user upon a proximity detect event. This enables the device to operate in a low power, standby state when not in use and then wakes-up into an active state when an obstacle/object approaches.

Capacitive proximity sensors can be employed in one embodiment. Capacitive proximity sensors are based on the principle of capacitance in a capacitive touch sensing application where a conductive pad or a loop is laid on a non-conductive substrate. The conductive pad includes a self-capacitance. When another conductive material (e.g., a human) comes close to the conductive pad, the capacitance of the sensor increases. The CPU 104 (microcontroller or processor device) continuously measures the capacitance of the sensor(s) 156 and looks for a sudden jump in capacitance to determine the presence of a conductive object near the sensor. Capacitive proximity sensors maximize the ratio of sensor capacitance change to self-capacitance for a given sensor to be able to reliably detect proximity. Capacitive sensors can be printed on glass using indium tin oxide (ITO) or other transparent conductors or metal ink on camera glass on a front of a the device 10, or the sensors can be placed at other suitable locations on the device 10.

High-level firmware algorithms in firmware stored in the collision avoidance app 58 can be employed to interpret the proximity sensor data from the proximity sensors 156 to provide a warning, e.g., on speaker 132, haptic device 166, light/beacon 28 (FIG. 1) or display an image or video on the display device 162 (e.g., screen 26, FIG. 1). These techniques could be as simple as implementing different levels of thresholds for different signal strengths (e.g., IR reflected back to the sensors, etc.) and outputting a signal to indicate levels of proximity. In some embodiments, different types of proximity sensors can be employed together.

Figure 8:
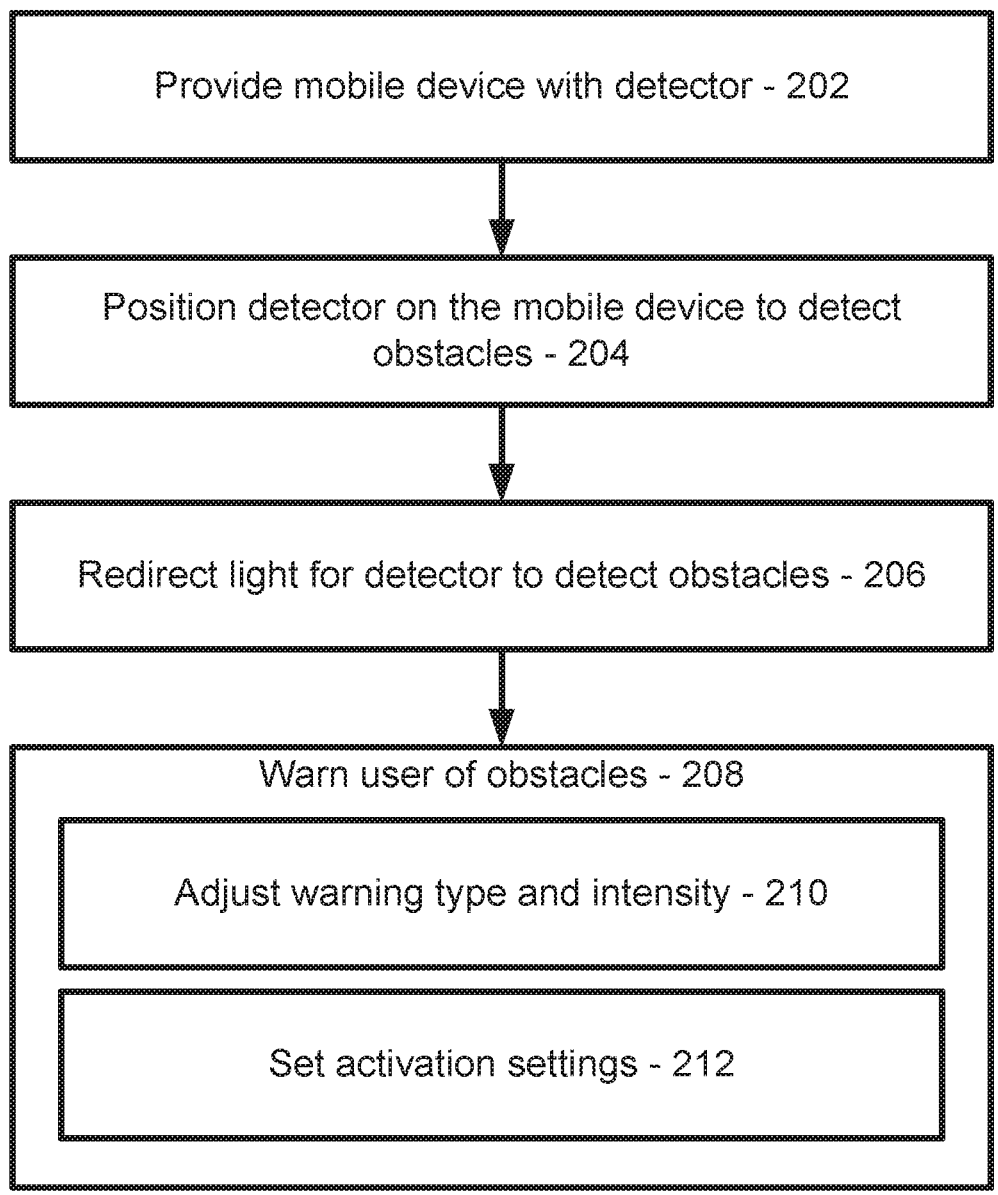
FIG. 8 is a block/flow diagram showing a system/method for avoiding collisions in accordance with embodiments of the present invention.

Referring to FIG. 8, a method for collision avoidance is shown in accordance with useful embodiments. In block 202, a mobile device having a display screen is provided with a detector or components provided with the device can be configured for use as a detector(s). The detector can include one or more proximity sensors, a camera or other sensing technology. The detect may or may not include an attachment, cover, slide, etc. to assist in providing images when the device is at an angle (e.g., while walking). The detector is preferably disposed on a side opposite the display screen.

In block 204, the detector is positioned or can be positioned (adjusted) or configured to detect any objects and obstacles present in a path of a user operating the display screen while moving. The detector can be repositioned by actuating the camera or proximity sensors, or a camera or proximity sensors can be preset at a useful angle. The useful angle includes the angle at which a user walks, jogs or moves with their mobile device so that an area ahead of the user can be monitored for approaching objects or obstacles. The angle can include about 20 degrees to about 75 degrees although other angles may be employed. A shield, cover, slide, etc. can be employed to assist in providing images when the device is at an angle (e.g., while walking).

In block 206, in an alternate embodiment, the incoming light is modified (redirected). For example, an optical device can be placed over the camera to provide light from a front area into the camera, which can be an on-board camera of the mobile device. The optical device can be present in a clip-on structure or cover or can be a slide provided on a mobile device case. The optical device can include a reflective or refractive media to redirect light into the camera. Other structures can also be employed.

In block 208, the user is warned of any objects and/or obstacles in their path. The warning device can include an alert such as one or more of: an audible alarm, a visible light, a haptic signal and an image on the screen. The warning device can include an image displayed in a portion of the screen while another application is being viewed by the user. The image displayed in the portion of the screen can include a video of activities in the path, a map depicting objects and obstacles in the path, a light or other alert image, a number or text warning (e.g., "danger") that can provide a range or level of danger, etc.

In block 210, the warning image can be activated by an application stored in memory of the mobile device, e.g., a cellular telephone. The application stored in memory can include user operations for setting a mode (e.g., video, map, bird's eye view, etc.) and intensity (e.g., brightness, flashing frequency, volume, pitch of sound, etc.) of an alert of the warning device. The image can be resizable and positionable on the screen. The map can be configurable for ease of use, e.g., a bird's eye view of an area in a direction of movement in the path can be provided.

In block 212, the obstacle avoidance feature can be automatically or manually activated or deactivated. These setting can be user selected. The warning can be automatically generated (triggered by a stimulus) or the warning system can be activated in advance by the user. In one embodiment, forward motion can be detected to activate the feature. In another embodiment, user steps can be employed to activate the feature. A step counter may be included in the device (10) already, or a user's FITBIT® or other step counter can be used to activate the feature. The step counter can provide a BLUETOOTH® signal that activates the app, or the app can be activated by the device's step counter. In another embodiment, the user can manually activate the feature by turning on the app using a touchscreen or other input (e.g., voice command). Deactivation of the feature can also be done in a similar manner as described.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g. in the form of code) described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of systems and methods for pedestrian collision avoidance (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A collision avoidance device, comprising:
    a mobile device having a display screen;
    a non-imaging proximity sensor disposed on a side opposite the display screen, the proximity sensor being positioned to detect any obstacles present in a path of a user operating the display screen while moving; and a warning device powered by the mobile device to alert the user of any obstacles in the path.

2. The device as recited in claim 1, wherein the warning device includes an alert selected from the group consisting of an audible alarm, a visible light, a haptic signal and an image on the screen.

3. The device as recited in claim 1, wherein the mobile device includes a cellular telephone and the warning device is activated by an application stored in memory of the cellular telephone.

4. The device as recited in claim 3, wherein the application stored in memory includes user options for setting a mode and intensity of an alert of the warning device.

5. The device as recited in claim 1, wherein the proximity sensor is activated to detect the objects and obstacles when steps of the user are detected.

6. A collision avoidance device, comprising:
a mobile device having a display screen;
a camera disposed on a side opposite the display screen;
a non-imaging proximity sensor disposed on a side opposite the display screen, the proximity sensor being positioned to detect any obstacles present in a path of a user operating the display screen while moving; and
a warning device powered by the mobile device to alert the user of any obstacles in the path.

7. The device as recited in claim 6, wherein the warning device includes an alert selected from the group consisting of an audible alarm, a visible light, a haptic signal and an image on the screen.

8. The device as recited in claim 6, wherein the mobile device includes a cellular telephone and the warning device is activated by an application stored in memory of the cellular telephone.

9. The device as recited in claim 8, wherein the application stored in memory includes user options for setting a mode and intensity of an alert of the warning device.

10. The device as recited in claim 6, wherein the proximity sensor includes a capacitive proximity.

11. The device as recited in claim 6, wherein the warning device includes an image displayed in a portion of the screen while another application is being viewed by the user.

12. The device as recited in claim 11, wherein the image displayed in the portion of the screen includes a video of activities in the path.

13. The device as recited in claim 11, wherein the image displayed in the portion of the screen includes a map depicting objects and obstacles in the path.

14. The device as recited in claim 13, wherein the map includes a bird's eye view of an area in a direction of movement in the path.

15. The device as recited in claim 11, wherein the image is resizable and positionable on the screen by a user.

16. The device as recited in claim 6, wherein the camera is coupled to an actuation device configured to angle the camera to capture images in front of the user as the user moves.

17. The device as recited in claim 6, further comprising an optical device being disposed in front of a lens of the camera to redirect light toward the camera to detect the objects and obstacles present in the path.

18. The device as recited in claim 16, wherein the optical device includes a reflective or refractive media.

19. The device as recited in claim 16, wherein the optical device includes a clip-on cover or a slide device to permit positioning of the optical device in an operational relationship with the camera.

20. A method form collision avoidance, comprising:
providing a mobile device having a display screen with a detector including a non-imaging proximity sensor disposed on a side opposite the display screen, the detector being positioned to detect any objects and obstacles present in a path of a user operating the display screen while moving; and
warning the user of any objects and obstacles in the path.

21. The device as recited in claim 1, wherein the proximity sensor includes a capacitive proximity sensor.

22. The device as recited in claim 1, wherein the proximity sensor includes an infrared proximity sensor.

23. The device as recited in claim 6, wherein the proximity sensor includes an infrared proximity sensor.

* * * * *